June 16, 1931.    K. FASSNACHT    1,810,040
ORNAMENTAL CHAIN
Filed July 18, 1929
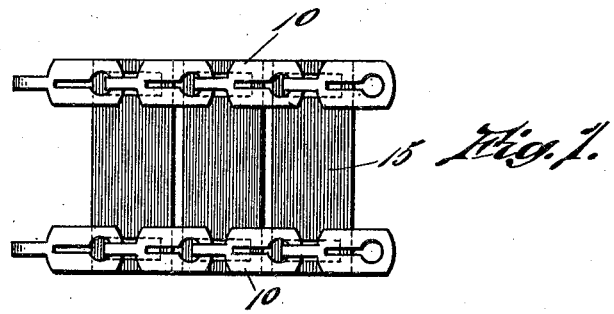
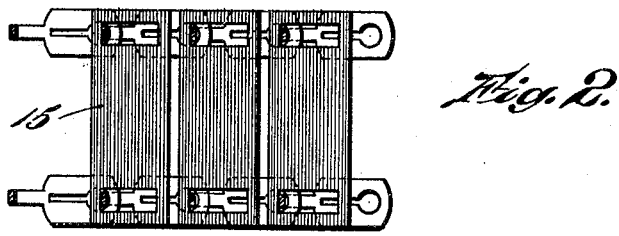
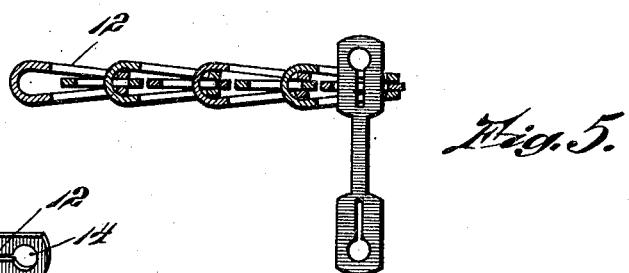
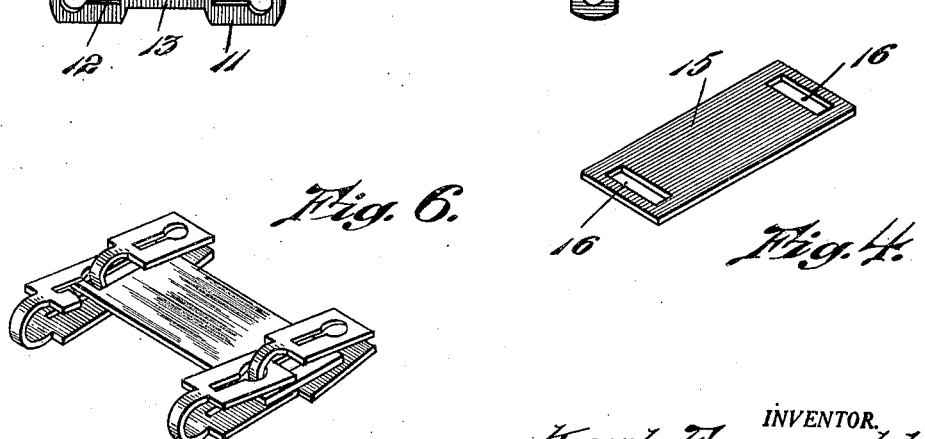
INVENTOR.
Karl Fassnacht.
BY Barlow & Barlow
ATTORNEYS.

Patented June 16, 1931

1,810,040

UNITED STATES PATENT OFFICE

KARL FASSNACHT, OF PROVIDENCE, RHODE ISLAND, ASSIGNOR TO SPEIDEL CHAIN CO., OF PROVIDENCE, RHODE ISLAND, A FIRM COMPOSED OF FREDERIC SPEIDEL AND EUGEN SPEIDEL, BOTH OF PFORZHEIM, GERMANY

ORNAMENTAL CHAIN

Application filed July 18, 1929. Serial No. 379,220.

This invention relates to an improved construction of band chain; and has for its object to provide a band having a link chain along each of its opposite edges, these edge chains being retained in spaced relation by a series of cross bars which are loosely connected at their ends to the links of these edge chains.

A further object of the invention is to form the links of the opposite chains each from a short length of stock folded upon itself and slotted at one or both of its ends, each link having a portion extending through the corresponding slot or slots of the next adjacent link member to loosely connect the links together and the links of the two chains being arranged to extend through a spacer bar whereby each bar is loosely connected to the links of the chains to maintain the chains in spaced relation.

With these and other objects in view, the invention consists of certain novel features of construction, as will be more fully described, and particularly pointed out in the appended claims.

In the accompanying drawings:

Fig. 1 is a front view of a short section of chain of my improved construction.

Fig. 2 is a view similar to Fig. 1 but omitting half of each link.

Fig. 3 is a perspective view of one of the links of the chain showing both ends slotted.

Fig. 4 is a perspective view of one of the spacing cross bars of the band showing both ends slotted and through which slots the links of the side chains extend.

Fig. 5 shows the stock of the links of the side chains as being folded upon itself and each successive link as having a shank portion passing through the registering slots of the adjacent links and also through the slots in the adjacent cross bar.

Fig. 6 is a perspective view of the construction illustrated in Fig. 5.

It is found in the construction of a broad or band type of chain, of advantage to form the link members of this chain from sheet stock, the band being formed of two series of edge links, each link being formed of a strip of flat stock slotted at its ends and threaded through the slots at the ends of the next adjacent link and then folded back upon itself to cause the slots to register one with the other, the two series of edge chains being maintained in spaced relation by a series of cross bars or plates extending between them. These cross bars are also slotted at their ends through which slots these links also extend to embrace the ends of the cross bars and so by which construction these cross bars are loosely connected to the edge chains of the band; and the following is a detailed description of the present embodiment of my invention showing one construction of chain band by which these advantageous results may be accomplished:

With reference to the drawings, 10 designates the chain positioned on opposite edges of the band, these chains being formed of links 11 preferably constructed of sheet stock slotted as at 12 at their ends and these slotted end portions are connected by a foldable shank portion 13, the slots in their ends being enlarged as at 14 to loosely receive the shank of the next link which is threaded therethrough.

These separate chains 10 which extend along the opposite edges of the band are connected together and retained in spaced relation by a series of cross bars or plates 15. These plates are also slotted as at 16 at their ends and these slots are arranged to register with the slots 12 in the links whereby when the next adjacent link is being threaded through the slots it extends not only through the slots in the link but also through the slot 16 in the corresponding plate or cross bar 15 thereby loosely connecting these cross bars to the side chains and without the use of solder thus forming a chain which is very flexible in its construction and may be made very rapidly, and by providing these cross plates with a broad exposed surface they readily lend themselves to a variety of ornamentation to render the chain band handsome and attractive in appearance.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a sheet metal chain band two spaced series of connected link members along opposite margins of the band and a series of spacing cross bars loosely connected at their ends to the links of each of said spaced series of links, said links extending along opposite surfaces of said cross bars.

2. In a sheet metal chain band two spaced series of connected links along opposite margins of the band and a series of spacing cross bars each being slotted at its end portions, the links of said side chains extending through the slots in said cross bars and along the opposite sides thereof to loosely connect the side chains to the opposite ends of said cross bars.

3. In a sheet metal chain band two spaced series of connected link members disposed along opposite margins of the band said chain links being formed each of a strip of sheet stock folded upon itself and slotted at its ends with its slots registering and through which slots the next adjacent link is threaded and a series of spacing cross bars each loosely connected at its ends to the links of each of said spaced series of links, and positioned between the folds of the links to which it is connected.

4. In a sheet metal chain band, a pair of spaced flexible link chains extending along opposite side edges of the band, the links of each chain being each formed of a short length of sheet stock having a slotted portion at each end connected by a bendable neck portion, a series of cross plates each having a slot at each end, the bendable neck portion of each link extending through the slots of the next adjacent link of the chain and through the slot in the adjacent end of the cross plate to loosely connect the links together and also connect the ends of the cross plates to the edge chains.

5. In a chain band, a pair of spaced flexible link chains extending along opposite side edges of the band, the links of each chain being each formed of a short length of sheet stock slotted at its ends, a series of cross plates each slotted at its ends said link members being each folded upon itself and extending through the slots of the next adjacent link and through the slot in the adjacent cross plate to extend along opposite surfaces of the cross plates and loosely connect the links together and loosely connect the cross plates to the links.

6. In a sheet metal chain band, two spaced series of connected links along opposite margins of the band and a series of spacing cross bars thru which portions of said links laterally extend to loosely connect said cross bars to the links of said spaced series of links, whereby said cross bars are prevented from movement along said connected links.

In testimony whereof I affix my signature.

KARL FASSNACHT.